Aug. 10, 1948.   E. HAZLEHURST   2,446,652
DRYING OIL COMPOSITION AND METHOD OF MAKING SAME
Filed April 1, 1943   2 Sheets-Sheet 1

INVENTOR
Edward Hazlehurst
BY
Gordon C. Willard
ATTORNEY

Aug. 10, 1948.　　　　E. HAZLEHURST　　　　2,446,652
DRYING OIL COMPOSITION AND METHOD OF MAKING SAME
Filed April 1, 1943　　　　　　　　　　　　2 Sheets-Sheet 2

INVENTOR
Edward Hazlehurst
BY
Gordon C. Willard
ATTORNEY

Patented Aug. 10, 1948

2,446,652

UNITED STATES PATENT OFFICE 2,446,652

DRYING OIL COMPOSITION AND METHOD OF MAKING SAME

Edward Hazlehurst, West Caldwell, N. J., assignor to Congoleum-Nairn Inc., a corporation of New York Application April 1, 1943, Serial No. 481,501

6 Claims. (Cl. 260—406)

This invention relates to drying oil oxidation. It relates especially to the oxidation of drying oils of the linseed oil type by aeration with an oxygen-containing gas.

It is a purpose of this invention, broadly stated, to afford highly reactive oxidized drying oil of the linseed oil type which, while highly oxidized, lacks any substantial polymerization that is characteristic of the highly oxidized drying oils heretofore produced. It is a further purpose of this invention to produce highly oxidized oil with minimum incidental polymerization by steps which are rapid and commercially practical.

Features of this invention relate to the novel oxidized drying oil product whose identifying characteristics, properties and advantages will be described in detail hereinbelow and to the method of producing such product. Features of this invention also relate to the preparation, from the reactive and highly oxidized oil of the invention, of reaction products with resinous materials.

A drying oil such as linseed oil has the property of gradually hardening upon exposure to air, a fact that has long been availed of especially in connection with surface finishing compositions, the drying oil being used either with or without resins, pigments, driers, etc., as a film-forming base material. The hardening of drying oils is known to be due to the combined effects of oxidation and polymerization. The oxidation and polymerization of drying oil can be caused to take place upon exposure of the drying oil in thin films to air or may be caused to take place "en masse" as by aeration or "blowing," namely, the forcing of air or other oxygen-containing gas through a mass of oil that is to be oxidized. The rate at which both oxidation and polymerization take place can be accelerated by heat and by addition of driers. Thus, if a body of drying oil is subjected to blowing in the usual way while at elevated temperature, e. g., while heated to a temperature of about 200° F. to 300° F., the oil can be oxidized and polymerized rapidly so as to result in the conversion of the oil to the gel or linoxyn stage, e. g., as in the conventional manufacture of certain types of linoleum cement.

The polymerization of a drying oil is the result of molecular association with the development of a more complex molecular structure and is evidenced by a bodying of the oil, namely, increase in viscosity. Polymerization is also evidenced by an increase in refractive index and by an increase in specific gravity and by a decrease in the iodine number of the oil. One can readily subject a drying oil to polymerization without subjecting the oil to substantial oxidation by excluding oxygen from the oil and heating the oil so as to accelerate the polymerization reaction. Such oils which have been thus heat-bodied or "boiled," and therefore polymerized without substantial oxidation, heretofore have been produced and are characterized by such properties as high viscosity without, however, tendency to form a gel even at room temperatures. An oil prepared in this manner can be caused to harden, but such hardening is due mainly to addition of oxygen and there is comparatively little further polymerization or association.

When attempt is made to oxidize a drying oil, the oxidation of the oil is inevitably accompanied by polymerization. Moreover, as a result of my research, I have found that the greater the extent to which a drying oil has been oxidized, the greater the rate at which polymerization takes place. Thus, in the aeration of a drying oil, at about 200° F. to 300° F. as in the manufacture of linoleum cement, there is fairly rapid oxidation at first with simultaneous occurrence of some polymerization. As the oxidation proceeds, the rate of oxidation diminishes and the rate at which polymerization takes place becomes increasingly fast with the result that, when the oil has been oxidized until it contains about 20% of oxygen, the oil has become so extensively polymerized that the product is a stiff, spongy gel. This gel can be hardened still further by gradual additional oxidation and polymerization as in the seasoning of linoleum composition. The gelled oil product is insoluble in ordinary solvents.

Attempts have been made heretofore to modify the characteristics of a blown drying oil by control of the temperature at which the blowing takes place, reference being made particularly to the process described in the Long and Ball Patent No. 2,059,259 wherein oxidation of oil by blowing at temperatures of the order of 100° F. to 140° F. is described, the temperature in any event not to exceed 165° F. The process is of extremely long duration, since the minimum blowing period is 100 hours and blowing for periods of 200 to 300 hours is said to be preferable. The reason for the long blowing period is that at low temperatures both the rate of oxidation and the rate of polymerization are slower, although, as stated in this patent, the rate at which polymerization takes place is reduced to a greater extent than the rate at which the oxidation takes place, with the result that the product of the long blowing period at relatively low blowing temperatures contains a greater percentage of added oxygen than a drying oil which has been blown in the ordinary way at higher temperatures of the order of 200 to 300° F. Notwithstanding the employment of the long blowing period at relatively low temperatures, there is even in such case a large amount of polymerization and the product is a gel at ordinary temperatures or is a very viscous fluid that gradually gels. However, the product when heated to about 165° F. melts to fluid form and can be dissolved in certain types of solvents, and when applied as a film will gradually harden. Due to the large amount of polymerization that occurs, the resulting product has such a complex molecular structure as to be relatively non-reactive. In fact, the product is more of a resinous character, and, instead of dissolving in drying oil solvents such as turpentine, petroleum spirits, etc., is soluble in resin solvents such as alcohol, etc., and becomes compatible with cellulose esters for use in lacquers and the like.

A modification of the process described in the Long and Ball Patent No. 2,059,259 is that described in the Novak Patent No. 2,178,604. According to the process described in Patent No. 2,178,604, drying oil is blown at a low temperature, below 70° C. (158° F.) with the final stages of blowing around 40 to 45° C. (104 to 113° F.); but the blowing is discontinued before substantial oxidation occurs, namely, for a linseed oil naturally having an oxygen content of about 10.6%, the blowing is discontinued when the oil has an oxygen content of about 11.5%. When the blowing is discontinued, the viscosity of the oil is said to be less than J on the Gardner scale, namely, less than 250 centipoises. By this treatment, the oil is said to be changed from an oil having a non-conjugated system to an oil having a conjugated system. The oil is said to resemble China-wood oil in this respect and in additional respects such as the capacity of the oil to harden more rapidly than ordinary linseed oil upon baking and the capacity to dissolve certain resins such as the phenol formaldehyde resins. However, hardening of the oil prepared as above described requires nearly as much oxidation and polymerization as is the case with ordinary unmodified linseed oil.

According to the present invention, a drying oil is brought to a highly oxidized condition by aeration so as to effect a very high degree of oxidation in a short time and with very little polymerization of the oil. As distinguished from the process of the Long and Ball Patent No. 2,059,259 which is carried out for a reaction period of 100 to 300 hours at a temperature below 165° F., the process of the present invention requires only a few hours, ordinarily about 3 to 6 hours, and in any case less than 10 hours, and is carried out at elevated temperature ordinarily between about 200° F. and about 300° F. The product that results from aeration according to this invention is a unique type of oil having properties that distinguish it from other natural or treated oils and that render it highly useful for a number of purposes. The outstanding properties of the oil are its reactivity and high degree of oxidation combined with low viscosity and low refractive index.

Thus the oxygen content of the new oil that is produced according to the present invention is at least 16.2% and may be readily produced with an oxygen content up to about 17.4%. The new oil has a viscosity under 4000 centipoises and preferably under 2500 centipoises at 77° F. Notwithstanding the high degree of oxidation of the oil, it is comparatively non-reactive inter se and will remain fluid for a considerable period of time at ordinary temperatures. However, when the new oil of this invention is heated, it will gel rapidly without substantial further oxidation. Thus, for example, when held at about 580° F., the new oil will gel in about 16 minutes. On the other hand, the new oil being of a relatively non-complex molecular structure, though highly oxidized, is very reactive with other substances such as natural or synthetic resins to form relatively complex resinous materials which are useful for paint and varnish manufacture and which are soluble in many solvents and solvent mixtures.

The production of a highly oxidized oil in a period of only a few hours, at high temperature but with relatively little polymerization of the oil, is achieved according to this invention by increasing the rate at which the oxidation of the oil takes place to such an extent that the oil becomes highly oxidized before there is an opportunity for molecular association to take place with building up of complex molecules and resultant increase in the viscosity and refractive index of the oxidized product.

The extent to which a drying oil may be oxidized by methods heretofore practiced has been governed by a number of factors. As aforesaid, by exclusion of air or other oxygen-containing gas, the rate and extent of oxidation can be held down. On the other hand, there are definite limits to the amount of oxidation that can be effected merely by blowing more air through the oil. As the amount of air that is bubbled through the oil is increased, the rate of oxidation increases so long as the bubble size remains small; but, if the amount of air is further increased so that large bubbles are formed which rise rapidly through the oil, this does not tend to increase the rate at which oxidation takes place, due to the fact that, since the bubbles are larger, there is not any increase in the interface between the oil and the air. As pointed out above, increase in temperature increases the rate of oxidation; but, since increase in temperature greatly increases the rate at which polymerization takes place, it has been regarded, prior to this invention, as impossible to effect a high degree of oxidation by blowing oil at elevated temperature without obtaining a high degree of polymerization and eventual gel formation before the oil is produced in a highly oxidized condition.

As a result of my research in connection with the oxidation of oil, I have discovered that the rate at which oxygen is taken up by oil is dependent upon how closely the ratio of the per cent. oxygen in the oil to the per cent. oxygen in the air in contact with the oil approaches an equilibrium that in turn is dependent upon the per cent. oxygen contained in the oil. In other words, during aeration of a drying oil, the rate of oxygen take-up by the oil steadily decreases as the oxygen content of the oil increases, and eventually an equilibrium condition is reached after which there is no further oxygen take-up. I have also found that the oxygen is taken up by the oil only by that portion of the oil located at the interface between the air and the oil, and that, as soon as the aforesaid equilibrium condition is reached or approached at the zone substantially at this interface between the bubbles of air and the oil, further penetration of the oxygen into the body of the oil does not take place and there is no substantial further oxidation of the oil in the vicinity of the bubbles.

More concretely, I have found that when bubbles of air are introduced into a mass of drying oil, the reaction proceeds at the interface between the bubbles of air and the oil so that about each bubble there is soon formed a more viscous shell of oxidized oil that surrounds the air bubble and prevents escape of air from the bubble. The result is that the oxidized oil in the shell about the bubble and the air within the bubble soon come into a state of equilibrium, or of near equilibrium at which further oxidation proceeds very slowly, and that thereafter the shell of oxidized oil and the air entrapped therein travel as a unit through the oil without substantial further oxidation of the oil either in the shell about the air bubble or elsewhere in the oil. The development of these shells of oxidized oil at bubble interfaces definitely limits the extent of increase in the rate at which a drying oil may be oxidized according to prior practice by such expedients as increasing the amount of air passed through the oil, by decreasing the size of the bubbles, or by increasing the extent of travel of the bubbles of air through the drying oil.

The present invention is based upon my discovery that the rate of oxidation of a drying oil can be very greatly increased by carrying on the oxidation under conditions which prevent to the greatest extent possible the development of equilibrium condition at the oil-air interfaces of the bubbles passing through or carried by the oil. According to the present invention, the shells of oxidized oil that are formed about the air bubbles are not permitted to remain intact and thereby keep the air in the individual air bubble out of direct contact with less oxidized oil outside the shells of oxidized oil, but are continually broken down so that the oil at the interfaces of the air bubbles is constantly renewed and corresponds to the degree of oxidation of the oil, taking the mass as a whole, thereby maintaining the disequilibrium between the air in the air bubbles and the oil in immediate contact therewith as great as possible.

The shells of oxidized oil that tend to surround the bubbles of air have a considerable resistance to disruption, for I have found that in order to prevent the persistance of such shells at the bubble interfaces, violent agitation of the oil being oxidized is required. This violent agitation is preferably accomplished by mechanical impulsion which has the effect of breaking up the bubbles of air and continuously providing in the mixture of oil and air new interfaces between the oil and the air at which a maximum state of disequilibrium exists.

The difference in action that takes place when oil is oxidized under the conditions of violent agitation above described is evident from the fact that a highly oxidized oil in a fluid and only slightly polymerized condition can be produced at temperatures of from 200 to 300° F. Heretofore, it has been regarded as inevitable that the higher the temperature at which aeration takes place the greater the polymerization of the oxidized oil for a given percentage increase in oxidation. In fact, it is for this reason that in the Long and Ball Patent No. 2,059,259 and in the Novak Patent No. 2,021,151 resort was made to low blowing temperature. In carrying out my process, however, I have found that the higher the temperature at which it is carried out, up to a limit of about 300° F., the less the resulting polymerization, this phenomenon being contrary to all prior practice. Thus, in order to obtain a given degree of oxidation according to the present process, less polymerization occurs when my process is carried out at 300° F., for example, than when my process is carried out at a temperature of 200° F.

When a drying oil is subjected to aeration with accompanying oxidation and polymerization, there is as aforesaid an increase in the viscosity, refractive index and specific gravity and a decrease in iodine number. However, the extent to which these properties are changed by an aeration operation does not indicate the extent to which oil has been oxidized, since these properties are changed in the same direction both by oxidation and by polymerization. For these reasons, I have determined the oxygen content both of naturally-occurring drying oil and of treated drying oil directly by means of combustion analysis, in the manner that is well known in the art and when reference is made herein and in the claims to oxygen content of such oils, the reference is to oxygen content as determined by combustion analysis. The relation of the oxygen content of the new oil as produced according to this invention when determined by combustion analysis to such properties as viscosity and index of refraction, is, however, definitive of the new oxidized drying oil of this invention in critical and significant respects. Notwithstanding the high oxygen content of drying oil aerated according to this invention, the viscosity and index of refraction remain surprisingly low. The combination of high oxygen content with a low viscosity is especially significant in characterizing the new oil of this invention and in distinguishing it from prior natural or treated oils.

The practice of this invention may be illustrated in connection with the aeration of a linseed oil which, as it normally occurs, has an oxygen content of about 11.2%, a viscosity of about 42 centipoises at 77° F., and an index of refraction at 77° F. of 1.4800.

*Treated oil—Example I*

A quantity of the linseed oil was subjected to aeration while at a temperature of about 200° F. for six hours. A volume of air corresponding to about 40% of the volume of the oil was passed through the oil about five times per minute while subjecting the oil to vigorous agitation with a mechanical agitator. Upon analyzing the resulting oil, it was found that it had an oxygen content of 16.2% and that it had a viscosity of only about 800 centipoises at 77° F. The index of refraction of the treated oil was only about 1.4845 at 77° F. The product thus produced is representative of an oxidized oil that is in the lower range of oxidation of oils that have been treated according to this invention.

*Treated oil—Example II*

The following is an example of the production of an oil in the upper portion of the range of oxygen content of oils that have been treated according to this invention. A quantity of linseed oil was treated in the manner mentioned in connection with the preceding example, except that the areation was carried out at a temperature of about 300° F. and for a period of about four hours. The resulting oil had an oxygen content of 17.4% and the oil had a viscosity of about 3000 centipoises at 77° F. The index of refraction of the treated oil was about 1.4870 at 77° F.

Treated oil—Example III

The following is an example of the production of an oil at an intermediate portion of the range of oxygen content of oils that have been treated according to this invention, this example being typical of the manufacture of preferred aerated oil for use in varnish making. A quantity of linseed oil was treated in the manner mentioned in the preceding examples, except that the aeration was carried out at a temperature of about 240° F. and for a period of about six hours. The resulting oil had an oxygen content of 17.1% and the oil had a viscosity of about 1900 centipoises at 77° F. The index of refraction of the treated oil was about 1.4862 at 77° F.

Somewhat more generally in the practice of this invention, a drying oil is subjected to aeration at a temperature from about 200° F. to about 300° F. for a period not over about 10 hours while the oil is subjected to violent agitation, and while oxygen is supplied to the oil at a rate that is greater than the rate at which the oxygen is taken up by the oil, namely, in the presence of an excess of oxygen-containing gas. Provision is made for maintaining the desired temperature and for introducing oxygen-containing gas into the oil and withdrawing spent gases. This operation is continued until the oxygen content of the oil is at least 16.2%. The extent to which increase in the viscosity of the oil is minimized will depend upon the violence with which the aeration is carried out, a factor which is under the control of the operator and may be varied within the scope of this invention and according to the practice thereof. In general, the aeration is carried out with violent agitation and with introduction of excess of oxygen-containing gas so that for a given viscosity of the oil in centipoises at 77° F. the oil will contain a minimum percentage of oxygen equivalent to 16 plus a factor the value of which is the ratio of the viscosity of the oil in centipoises at 77° F. to 4000, the minimum viscosity of the oil being at least 800 centipoises at 77° F. and the minimum oxygen content of the oil being at least 16.2%. Thus, by way of example, if the oxidized oil product has a viscosity of about 4000 centipoises at 77° F., the product preferably has a minimum oxygen content equivalent to about 17%. For certain purposes, however, for example for reaction with resins, it is sufficient to carry out the aeration so that the oxygen content of the oil will be between 16.2% and 17.4%, the viscosity not being greater than about 4000 centipoises at 77° F.

While the oxygen content can be carried to as great an extent as desired according to this invention with such increase in viscosity as is incidental thereto and with a greater oxygen content for a given viscosity of the product than has been obtained heretofore, if the aeration is carried out so that the oil contains more than about 17.4% the oil becomes so reactive, particularly inter se, that it is less desirable for most purposes than treated oils having an oxygen content between 16.2% and 17.4% and having a viscosity not greater than about 4000 centipoises at 77° F.

The oxidized drying oil produced having the characteristics above mentioned is to be contrasted with prior products of oxidation of drying oils. Thus, when ordinary blowing methods are employed and the blowing of the oil is carried out at a temperature between about 200° F. and about 300° F., the product is a spongy gel having an oxygen content of about 20% and does not have the reactive properties of the oil produced according to this invention and is substantially insoluble in ordinary solvents. The product of prolonged blowing at low temperatures as described in the Long and Ball Patent No. 2,059,259, while having a high oxygen content, is also characterized by being a gel or near gel that is useful in coating composition by dissolving it in lacquer solvents and that is not particularly reactive. The product described in the Novak Patent No. 2,178,604 contains only about 11.5% and a viscosity less than 250 centipoises. Furthermore, measurements of the ultra-violet light absorption show a curve that is different from oxidized drying oils heretofore produced, thus indicating the presence in the new aerated oil of this invention of chemical groups that are not found in oxidized drying oils previously produced.

In carrying out the process of the invention, the drying oil is ordinarily blown with air, since air is readily available and is suitable for the purpose. However, it is apparent that any other oxygen-containing gas may likewise be used and that the amount of oxygen comprised in the gas may be varied. If desired, air that has been enriched with oxygen may be used with some acceleration of the oxidizing action, but when the aeration is conducted under conditions of violent agitation according to this invention the benefit resulting from enriching the air with oxygen is not sufficiently great to warrant the expense of so doing.

In order to effect the violent agitation of the mass during the aeration and thereby break down the shells of oxidized oil that tend to surround the air bubbles and isolate the air contained therein from the rest of the oil, any means may be used for subjecting the mass of bubble-containing oil to violent mechanical action while the air, in the form of a multiplicity of bubbles, is passing therethrough and while maintaining the oil at desired aeration temperature. Merely for purposes of illustration and without intention to be limited thereto for practice of this invention, a suitable type of equipment wherein the aeration may be effected is shown in the accompanying drawing, wherein Figure 1 is a side elevation largely in section;

Figure 1:
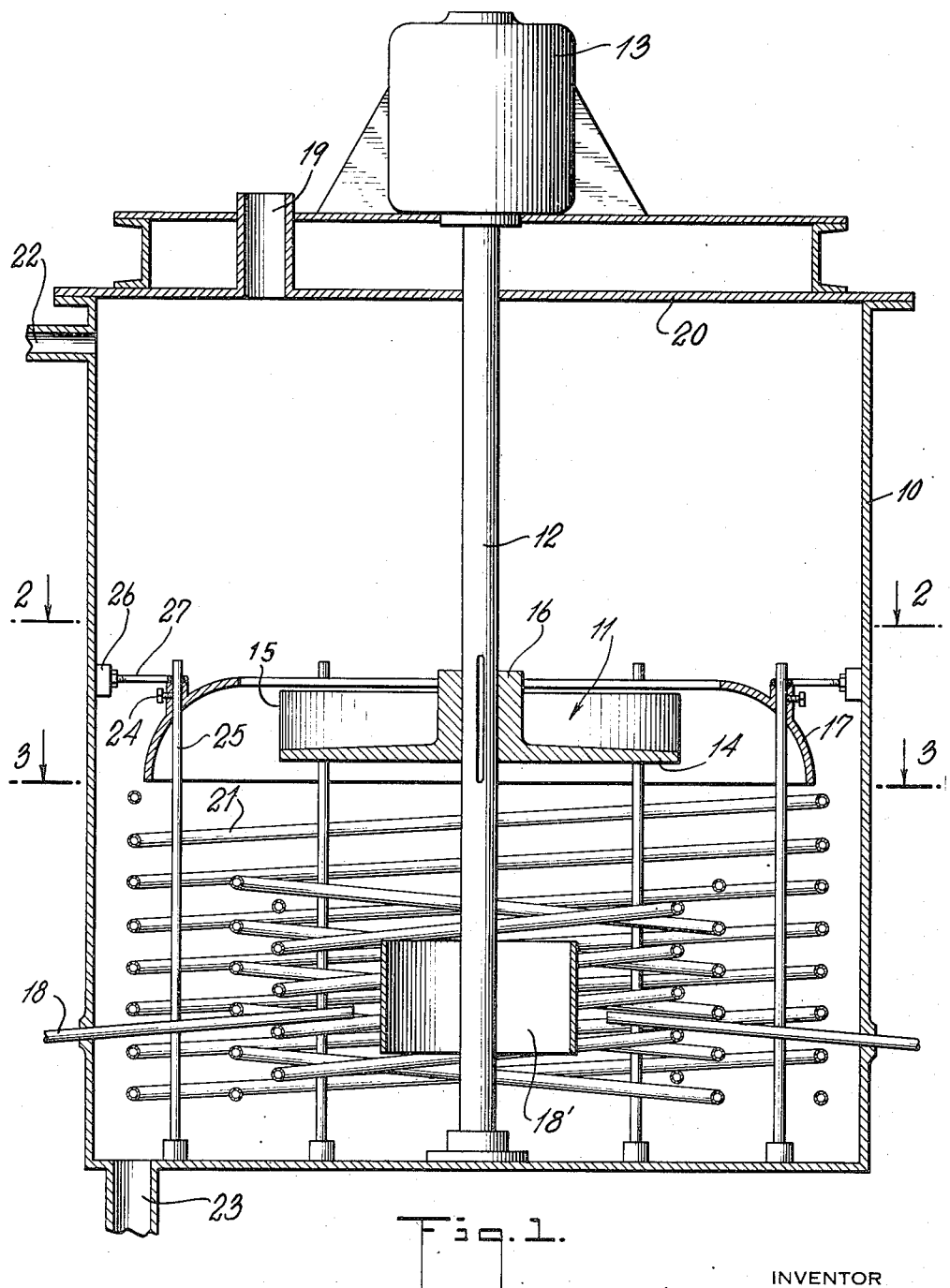
Figure 2:
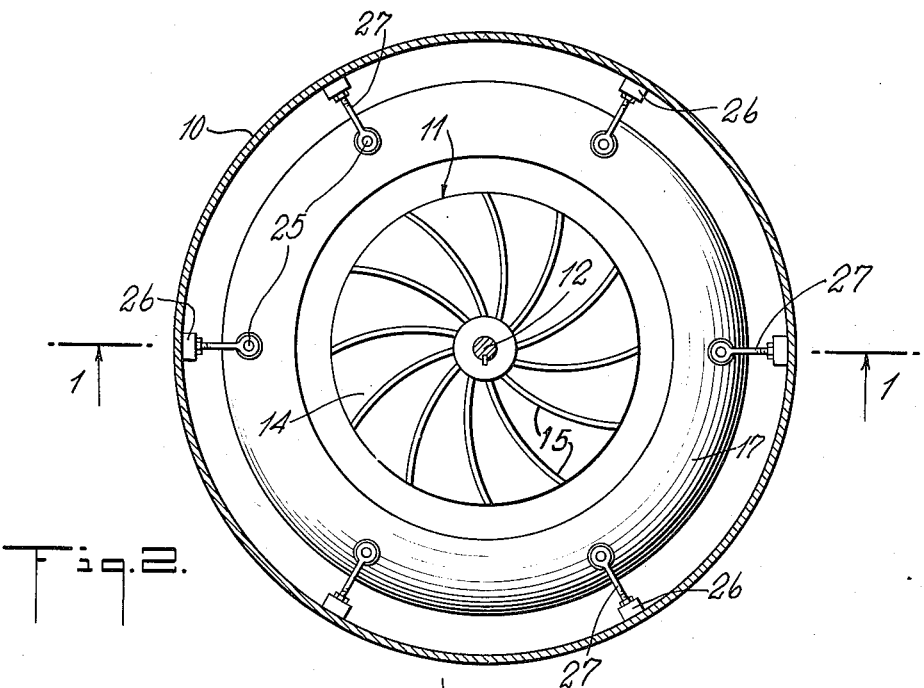
Fig. 2 is a section taken on the line 2—2 of Fig. 1.
Figure 3:
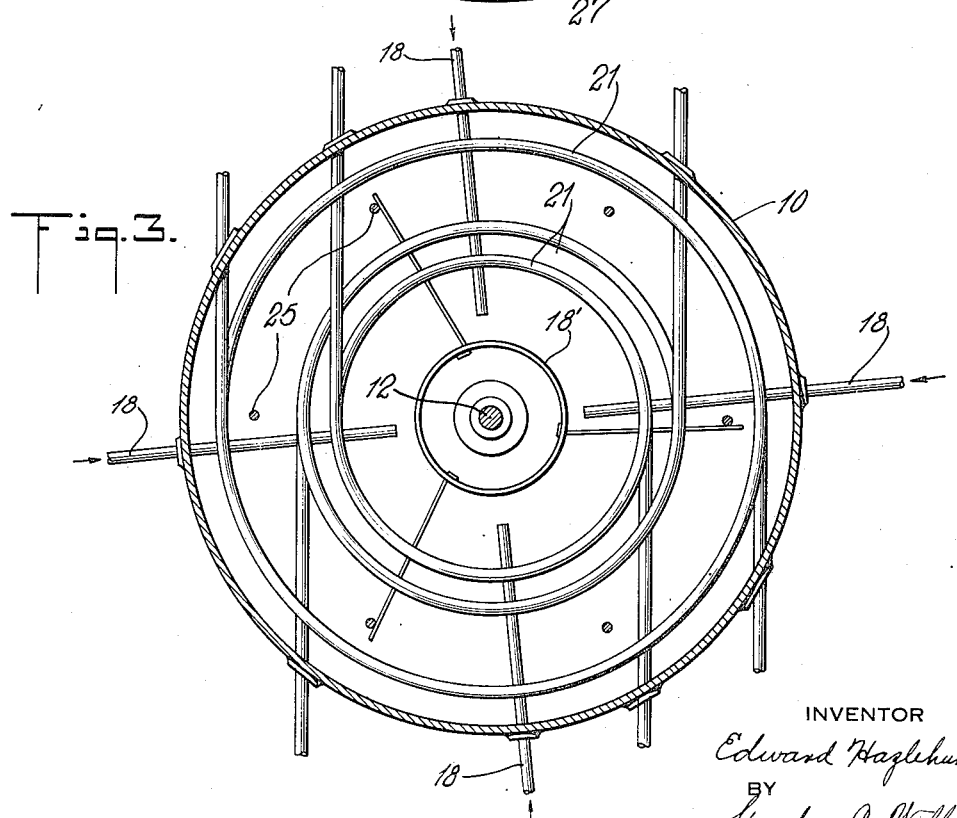
Fig. 3 is a section taken on the line 3—3 of Fig. 1.

Within the container or tank 10 is the impeller that is indicated generally by the reference character 11 and that is carried by and rotatable with the vertical rotatable shaft 12 which is power-driven by any suitable means, such as the motor 13. In the device shown, the impeller consists of a horizontally-disposed disk portion 14 and a plurality of upstanding vanes 15 extending from the hub 16 to the periphery of the disk portion 14, the vanes being curved away from the normal direction of rotation of the impeller so as to throw liquid in contact therewith outwardly upon rotation of the impeller. At approximately the level of the vanes 15 and spaced somewhat from the outer ends thereof is a deflector 17 which is curved downwardly as shown so that liquid thrown outwardly by the vanes of the impeller is directed downwardly in the tank. The liquid directed downwardly by the deflector 17 is projected toward the bottom of the tank, the return flow passing between the outside of the deflector 17 and the wall of the tank to the upper side of the impeller 11 which again throws the liquid outwardly against the deflector for recirculation in the tank.

Air for aerating the oil in the tank 10 may be introduced into the tank by means of air inlet lines 18, the ends of which are preferably positioned so that the air is introduced into the orbit or path of the oil as set up by the impeller 11 and deflector 17. If desired, the distribution of the air can be assisted by directing air ejected from the air inlet tubes against the target 18'. The spent air can escape from the tank 10 by an outlet line 19 in the cover 20. For keeping the oil at proper temperature, pipe coils 21 may be used, these coils being provided with appropriate inlets and outlets as shown for heated fluid, e. g., steam. Oil to be treated can be introduced into the tank by line 22 (controlled by a suitable valve, not shown) and the oil, after the aeration treatment, may be withdrawn from the tank by the line 23 (also controlled by a suitable valve, not shown). In order to control the circulatory path of liquid that is set up in the apparatus, the deflector 17 may be provided with vertical-adjustment means 24 on vertical support rods 25 and horizontal-adjustment means 26 on spacer bars 27.

When the dimensions of the device are such that the tank is about six feet in diameter, the impeller is about 3.5 feet in diameter, the deflector is spaced from the impeller and from the tank wall by about six inches and eight inches respectively, the blades of the impeller are about seven inches in height, and the distance from the impeller to the bottom of the tank is about four feet, a suitably violent agitation of the oil in the tank can be obtained when the impeller is rotated at the rate of about 125 rotations per minute. At the start of the operation, the tank is filled to slightly above the level of the top of the impeller with 900 gallons of oil, the oil is brought to the proper temperature, and, while rotating the impeller to set up the violent agitation of the oil, air is introduced at the rate of about 500 cubic feet per minute. During the aeration, the air becomes mixed with the oil in the form of a multiplicity of minute bubbles that are carried in the violently circulating oil-air mixture and, by the action of the impeller blades and baffle means in the tank, the bubbles are broken down with continuous reformation of the interfaces between the bubbles and the oil, and consequent maintenance of maximum disequilibrium between the oil and the air in the manner above described that promotes rapid uptake of oxygen by the oil.

In carrying out the aeration of the oil in the equipment above described or some equivalent equipment for subjecting the oil-air mixture to violent agitation by mechanical impulsion, the amount of air that is retained in the oil-air mixture by volume will usually run about 25% or more and preferably will be about 40% by volume of the oil-air mixture. The swirling or circulatory action set up by the violent agitation assists in maintaining the amount of air in the oil-air mixture. The air is continuously introduced into the oil-air mixture at such rate that the air in the oil-air mixture is replaced about 2 to 7 times per minute. The air can be introduced at a greater rate, but this is not necessary. If some oxygen-containing gas other than air is introduced into the aeration zone, the amount of such gas will vary from that indicated above as desirable when air is used. Thus, if air enriched with oxygen is employed, the amount of the oxygen-enriched gas would be somewhat less than when ordinary atmospheric air is employed.

In carrying out aeration of a drying oil according to this invention, I have found that driers are catalysts not only for oxidation but also for polymerization and that their catalytic action promoting oxidation decreases as the percentage of added oxygen increases while their catalytic action in promoting polymerization increases as the percentage of added oxygen increases. While a drier can be used in the aeration of a drying oil according to this invention, I prefer to use no drier at all. As compared with no drier at all, the tendency to undesirably promote polymerization is increased in ascending order by lead, cobalt and manganese.

Drying oil, that has been subjected to aeration as hereinabove described and having the properties hereinabove described and defined, is notable for its reactivity. This is believed to be due to the fact that the oil, while highly oxidized, still retains a relatively simple molecular structure, as indicated by the low values for viscosity and index of refraction. In a highly oxidized oil product of the type theretofore produced which, because of intermolecular association, has become of high viscosity and of high refractive index, the complexity of the molecular structure renders such products relatively non-reactive. The aerated oil of this invention being of relatively simple molecular structure can therefore react with other materials to form compounds of more complex structure, and the highly-oxidized condition of the product affords readily reactive groups or functions through which such reactions can take place. These highly reactive groups or functions that are present in the aerated oil of this invention are not found in drying oil materials which, while still in an essentially non-polymerized condition (not molecularly complex), do not contain the high percentage of oxygen of the highly-oxidized aerated oil of this invention. The aerated oil of this invention is particularly reactive where the reaction involves liberation of oxygen from the reacting materials, usually with more or less water formation as a by-product of the reaction.

The reactivity of the aerated oil of the invention may be illustrated in connection with its capacity to react with natural or synthetic resins. Thus, I have found that the aerated oil of this invention may be processed with natural or synthetic resins to produce varnishes of higher body than heretofore obtained, using lower cooking temperatures and shorter reaction periods.

*Example 1.—Varnish with modified phenolic resin*

To prepare a varnish comprising one part of modified phenolic resin and two parts of the new aerated linseed oil of this invention, it constitutes sufficient cooking to heat to 550° F. in 35 minutes and hold this heat for only 20 minutes. The resulting product when cut to 50% solids with mineral spirits has a viscosity of 400 centipoises at 77° F. Using untreated linseed oil in the same proportion, the usual cooking schedule has been to heat the mixture to 580° F. in 35 minutes and to hold the mixture at this temperature for 360 minutes. Such varnish when cut 50% with mineral spirits will have a viscosity of approximately 200 centipoises at 77° F.

*Example 2.—Varnish with unmodified phenolic resin*

One part of straight phenolic resin in admixture with two parts of the aerated oil of this invention is heated to 450° F. in 35 minutes and held at this temperature for 20 minutes. When the resulting product is cut to 50% which with mineral spirits containing 15% xylol, the viscosity of the resulting solution is 900 centipoises at 77° F. This cooking time is considerably shorter than that required in carrying out a similar operation using China-wood oil.

Example 3.—Varnish with limed rosin

My new aerated oil is particularly adapted for producing satisfactory varnishes with limed rosin. For example, one part of limed rosin and two parts of aerated oil are heated in 35 minutes to 550° F. and held at this temperature for 100 minutes. The resulting product, when thinned 50% with mineral spirits, has a viscosity of 400 centipoises at 77° F.

Certain types of varnish heretofore produced consist of a highly bodied oil-resin dissolved or dispersed in a larger amount of moderately bodied oil. In the production of such varnishes, the employment of a two-stage cooking process has been essential. For example, in the two-stage cooking process, a drying oil-resin mixture is processed at usual cooking temperature, e. g., 550° F. to 575° F. until a very high viscosity oil-resin has been obtained, this step usually requiring about 90 to 120 minutes. Thereafter, additional drying oil is added, which chills the oil-resin to about 400° F. or less, and the mixture is thereafter brought up to about 550° F. and held at this temperature until the oil last added is moderately bodied (ordinarily requiring a shorter period of heating than the original cooking of the oil-resin mixture) to produce a product wherein the originally cooked oil-resin mixture becomes dispersed or dissolved in the moderately bodied oil last added. By employing the highly reactive aerated oil of this invention a similar effect can be produced in a single cooking step. For example, by mixing resin and the specially aerated oil of this invention in proportions desired to react with each other, together with a non-reactive oil such as raw linseed oil, and heating the mixture to cooking temperature, the special aerated oil and resin react with each other to form a highly bodied oil-resin product before the non-reactive oil becomes more than moderately bodied.

Varnishes made from the special aerated oil of this invention are characterized by greater body, more rapid drying and better resistance to water and alkali than varnishes made with corresponding resins but with untreated drying oils of the linseed oil type. In making varnishes and the like, examples of resinous materials which may be reacted with the special aerated oil of this invention are natural resins such as rosin, congo, kauri, estergum, etc., and synthetic resins such as phenol-aldehyde resins, modified phenol-aldehyde resins, alkyd resins of the glyptal type, etc. In fact, in the complete list of resins, both natural and synthetic, heretofore known and used for varnish making, I have discovered none that does not react with my new oil to produce an equally or more satisfactory varnish than results when using a similar but untreated oil.

In order to illustrate the advantages incident to the manufacture of varnishes using my new aerated drying oil, varnishes so prepared using as typical resins limed rosin and modified phenolic resin respectively are compared in the following table with similar varnishes prepared with dehydrated castor-oil, linseed oil heat bodied for 750 minutes at 550° F., maleic treated linseed oil and raw linseed oil. The oil indicated as "my aerated linseed oil" is oil corresponding to "Treated Oil—Example III" hereinabove. In each case the oil-resin mixture consisting of two parts of oil to one part of resin was brought to a top processing temperature of 550° F. in 35 minutes and was maintained at top processing temperature for the interval set forth in the table. The resulting varnish base was mixed with mineral spirits as solvent or thinner to form a varnish composition containing about 50% by weight of thinner and about 50% by weight of the varnish base. To this mixture was added drier which, based on the composition as a whole, consisted of 0.5% lead plus 0.05% cobalt. In the following table, LR indicates limed rosin and MP indicates modified phenolic resin.

| Type Oil | Type Resin | Heating Time at Top Temperature in Minutes | Viscosity in Centipoises at 77° F. After Thinning | Film Drying Time to Dust Free in Minutes | Water Resistance | Alkali Resistance |
|---|---|---|---|---|---|---|
| My aerated Oil | LR | 100 | 400 | 35 | Good | Fair. |
| Dehydrated castor-oil | LR | 115 | 100 | 100 | Fair | Do. |
| Heat bodied linseed oil | LR | 30 | 70 | 70 | do | Poor. |
| Maleic treated linseed oil | LR | Material separates—varnish unsatisfactory. | | | | |
| My aerated Oil | MP | 20 | 300 | 25 | Very good | Very good. |
| Dehydrated castor-oil | MP | 20 | 100 | 80 | do | Do. |
| Maleic treated linseed oil | MP | 20 | 60 | 45 | Good | Good. |
| Raw Linseed Oil | MP | 212 | 45 | 90 | Fair | Fair. |

As distinguished from blown or oxidized oils heretofore known, the special aerated oil of this invention when heated alone or with resins as in varnish manufacture does not foam excessively. Any foam that may form breaks readily without endangering the operator or the equipment. Oxidized oils heretofore produced have invariably foamed so excessively in attempts to prepare varnish therefrom that they could not safely be utilized.

The temperature at which the oil resin mixture is maintained during the period of reaction between the special treated oil and the resin may be varied. Usually it is desirable to promote the rapidity of the reaction by heating the oil-resin mixture nearly to the tempertaure at which substantial pyrolytic decomposition takes place. In the ordinary case, it is desirable to carry out the reaction between the special treated oil and the resin at a temperature between about 200° F. and about 600° F. and it is usually preferable to carry out the reaction in the upper portion of this temperature range, namely, between about 450° F. and about 550° F.

The new aerated drying oil of this invention is of value for uses other than varnish making. Thus my new aerated oil may be used as a plasticizer for cellulose ester lacquers. The following is a typical example of such a lacquer.

| | Parts |
|---|---|
| Nitrocellulose (½ second viscosity) | 100 |
| My aerated oil | 25 |
| Dibutyl phthalate | 25 |
| Solvent to produce total solids content of 20 to 25% using a solvent consisting of 20% butyl acetate, 20% ethyl acetate, 20% ethyl alcohol, and 40% toluol | |

The aerated oil of this invention is also highly desirable as a medium for grinding pigments to be used in the manufacture of cellulose nitrate and ethyl cellulose enamels. My new aerated oil is highly desirable for this purpose because of its good wetting power and compatibility with such enamels.

The aerated drying oil of this invention may likewise be used as a binder for brake lining. The following is a typical example of a composition suitable for this purpose which is vulcanizable at a temperature of the order of 250° F. to 400° F.

| | Parts |
|---|---|
| My aerated oil | 23 |
| Asbestos fiber | 74 |
| Carbon black | 2 |
| Sulfur | 1 |
| Varnolene | 8 |

The aerated drying oil of this invention when vulcanized with sulfur, or preferably with ammonium sulfocyanide, is also useful as a rubber extender and tackifier.

While this invention has been described primarily in connection with linseed oil, this has been done for purposes of illustration and it is apparent that this invention is applicable to other drying or semi-drying oils of the linseed oil type, such as soya bean oil, fish oil and perilla oil. Fish oil embraces oils such as menhaden, sardine, pilchard, etc. Such oils contain a high proportion of constituents, such as glycerides of linolic and linolenic acids, which are capable of being converted by the oxidizing treatment to substances which are in fluid phase and capable of coagulating and hardening without substantial further oxidation and, after the oxidation treatment, such constituents constitute what are referred to herein as the hardenable oxidized constituents in fluid phase. Such drying oils also contain a relatively low proportion of substances, such as glycerides of saturated organic acids, which are not oxidizable in the oxidizing treatment; and they contain a relatively low proportion of constituents which are converted by the oxidizing treatment into substances which do not coagulate or harden either upon standing or exposure to air or other oxidizing influences, such as glyceride of oleic acid; and they contain little, if any, of constituents which are unavoidably converted by the oxidizing treatment into substances which exist only in coagulated form, such as glyceryl elaeostearate which is present in large proportion in China-wood oil and of which the oxidation product is coagulated. In carrying out the aeration process according to this invention, it is the production of the hardenable oxidized constituents in fluid phase that is of chief concern and it is these constituents that have been brought to a more highly oxidized condition than heretofore for a given viscosity, or, conversely, for a given oxygen content these constituents have been produced in a more fluid and reactive condition than heretofore.

When other drying oils of the linseed oil type are subjected to aeration in the practice of this invention, the resulting changes and improvements are similar to those hereinabove described in connection with linseed oil, and the same applies to varnishes prepared utilizing the aerated drying oils of this invention. The properties of these other drying oils as well as the optimum percentage of oxidation for particular purposes will vary slightly from linseed oil due to the fact that in the different oils the relative percentage of the different components varies. Thus treated soya bean oil for most purposes is somewhat superior to treated linseed oil due to the higher percentage of oleic glyceride in soya bean oil. However, treated soya bean oil bodies very rapidly and will form varnishes and coatings very similar to treated linseed oil.

Instead of oxidizing a whole oil or described hereinabove, one can likewise, according to this invention, treat the oil prior to the aeration so as to separate the more unsaturated constituents such as the glycerides of linolic and linolenic acids from the constituents which are unoxidizable or less oxidizable or which even though oxidized are unhardenable. In Patent No. 2,291,461, a large number of solvents are disclosed whereby such separation can be made with varying degrees of completeness. After such separation has been made, the portion containing those components which upon aeration result in hardenable oxidized constituents in fluid phase may be subjected to aeration according to this invention and in the manner hereinabove described and the resulting product will have the high oxygen content and low viscosity characteristics that are typical of the products produced according to this invention. The per cent. oxygen content for a given viscosity will in such case be slightly greater (i. e., .1 to .5%) than the per cent. oxygen content for a given viscosity in the case of whole oil aerated according to this invention, depending upon the extent to which unoxidizable or difficulty oxidizable constituents have been removed from the whole oil prior to aeration. A drying oil of the linseed oil type from which the less desirable constituents have been extracted prior to the oxidation treatment according to this invention will have somewhat greater reactivity and bodying properties both alone and in varnishes than the corresponding raw oils due to the lower content of undesirable constituents such as oleic glyceride.

Where reference is made herein and in the claims to aeration of a drying oil, it is to be understood that the oil subjected to aeration may be a whole drying oil or drying oil containing oxidizable constituents from which certain constituents of the oil have been separated.

While this invention has been described in connection with certain typical examples of the practice thereof, it is to be understood that this has been done for illustrative purposes only and that the practice of this invention may be varied within the scope of this invention as defined by the following claims.

I claim:
1. A process which comprises aerating a body of oxidizable oil selected from the group consisting of linseed oil, soya bean oil, fish oil and perilla oil with an excess of oxygen-containing gas distributed in the form of a multiplicity of bubbles in said body of oil while maintaining the mixture of said oil and said oxygen-containing gas at a temperature of the order of 200° F. to 300° F., and promoting rapid uptake of oxygen by said oil during said aeration by subjecting the mixture of said oil with said oxygen-containing gas to mechanical impulsion to break up the oil films at the interface between the oil and the bubbles of said oxygen-containing gas contained therein and to set up a violent circulatory motion of the said mixture, the amount of said oxygen-containing gas maintained in said mixture being at least about 25% of the volume of said mixture, and an amount of said oxygen-containing gas corresponding to at least about 25% by volume of said mixture being passed through the oil about 2 to 7 times per minute, the aeration being continued under said conditions until the oxygen content of the oil is between about 16.2% and about 17.4% and the viscosity of the oil in centipoises at 77° F. is between about 800 and about 4000.

2. As a new product, a product of oxidation of an oxidizable oil selected from the group consisting of linseed oil, soya bean oil, fish oil and perilla oil which is characterized by high oxygen content and relatively low viscosity, the viscosity of the product being at least about 800 centipoises at 77° F. and not greater than about 4000 centipoises at 77° F. and the minimum percent oxygen content of the product being equal to 16 plus a factor the value of which is the ratio of the viscosity of the product in centipoises at 77° F. to 4000, said product resulting from the process of claim 6.

3. As a new product, a product of oxidation of an oxidizable oil selected from the group consisting of linseed oil, soya bean oil, fish oil and perilla oil which is in fluid phase and which is characterized by high oxygen content and relatively low viscosity, the minimum percent oxygen content for any given viscosity in centipoises at 77° F. of 800 or greater being equal to 16 plus a factor the value of which is the ratio of the viscosity in centipoises of the product at 77° F. to 4000, the minimum oxygen content of the product being between about 16.2% and about 17.4% and the maximum viscosity of the product being about 4000 centipoises at 77° F., said product resulting from the process of claim 5.

4. As a new product, oxidized linseed oil which is characterized by high oxygen content and relatively low viscosity and refractive index, the oxygen content of the product being between 16.2% and 17.4%, the viscosity of the product in centipoises at 77° F. being between 800 and 4000, and the index of refraction at 77° F. of the product being between 1.4845 and 1.4870, the minimum percent oxygen content being equal to 16 plus a factor the value of which is the ratio of the viscosity in centipoises of the product at 77° F. to 4000 and said product resulting from the process of claim 1.

5. The process of oxidizing an oxidizable oil selected from the group consisting of linseed oil, soya bean oil, fish oil and perilla oil which comprises subjecting a body of said oil to aeration at a temperature of the order of 200° F. to 300° F. for a period not in excess of ten hours in the presence of an oxygen-containing gas distributed in the form of a multiplicity of bubbles in said body of oil, continuously maintaining in intimate admixture with said body of oil during said aeration an amount of the oxygen-containing gas in the ratio of 1 to 2 parts by volume of the oxygen-containing gas to 3 parts by volume of oil, introducing into and removing from said body of oil this amount of the oxygen-containing gas at the rate of 2 to 7 times per minute, subjecting the mixture of oil and oxygen-containing gas to violent agitation by mechanical impulsion to break up the oil films at the interface between the oil and the bubbles of the oxygen-containing gas contained therein, and discontinuing said aeration when the oxygen content of the resulting oxidized oil is increased to between about 16.2% and about 17.4% and the resulting oxidized oil has a viscosity not exceeding about 4000 centipoises at 77° F.

6. The process which comprises aerating a body of oxidizable oil selected from the group consisting of linseed oil, soya bean oil, fish oil and perilla oil with an oxygen-containing gas distributed in the form of multiplicity of bubbles in said body of oil while maintaining the mixture of said oil and said oxygen-containing gas at a temperature of the order of 200° F. to 300° F., promoting the rapid uptake of oxygen by said oil from said oxygen-containing gas relative to the rate of bodying of said oil by continuously maintaining in intimate admixture with said body of oil during said aeration an amount of the oxygen-containing gas in the ratio of approximately 2 parts by volume of the oxygen-containing gas to 3 parts by volume of oil and introducing into and removing from said body of oil this amount of the oxygen-containing gas at the rate of 2 to 7 times per minute, subjecting the mixture of oil and oxygen-containing gas to violent agitation by mechanical impulsion to break up the oil films at the interface between the oil and the bubbles of the oxygen-containing gas contained therein, and continuing said aeration until the viscosity of the fluid oxidized oil product is at least about 800 centipoises but not greater than about 4000 centipoises at 77° F. and until the fluid oxidized oil product contains a minimum percentage of oxygen equivalent to 16 plus a factor the value of which is the ratio of said viscosity of the oil in centipoises at 77° F. to 4000.

EDWARD HAZLEHURST.

REFERENCES CITED

The following references are of record in the file of this patent:

UNITED STATES PATENTS

| Number | Name | Date |
|---|---|---|
| 312,351 | Hoard | Feb. 17, 1885 |
| 396,636 | Wiggin | Jan. 22, 1889 |
| 1,949,028 | Schwarcman | Feb. 27, 1934 |
| 2,028,758 | Dietz | Jan. 28, 1936 |
| 2,160,861 | Hassard | June 6, 1939 |